(12) United States Patent
Catrein et al.

(10) Patent No.: US 8,798,264 B2
(45) Date of Patent: Aug. 5, 2014

(54) TECHNIQUE FOR HANDLING MEDIA CONTENT TO BE ACCESSIBLE VIA MULTIPLE MEDIA TRACKS

(75) Inventors: Daniel Catrein, Würselen (DE); Frank Hartung, Herzogenrath (DE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 13/130,866

(22) PCT Filed: Nov. 26, 2008

(86) PCT No.: PCT/EP2008/010031
§ 371 (c)(1),
(2), (4) Date: Jul. 15, 2011

(87) PCT Pub. No.: WO2010/060442
PCT Pub. Date: Jun. 3, 2010

(65) Prior Publication Data
US 2011/0261957 A1 Oct. 27, 2011

(51) Int. Cl.
*H04L 9/00* (2006.01)
(52) U.S. Cl.
USPC .......................................................... 380/42
(58) Field of Classification Search
None
See application file for complete search history.

(56) References Cited

U.S. PATENT DOCUMENTS

| | | | |
|---|---|---|---|
| 7,580,520 B2 * | 8/2009 | Apostolopoulos et al. | 380/42 |
| 7,929,463 B2 | 4/2011 | Mizutani et al. | |
| 2004/0006575 A1 | 1/2004 | Visharam et al. | |
| 2007/0022215 A1 * | 1/2007 | Singer et al. | 709/246 |
| 2007/0041585 A1 * | 2/2007 | Ji et al. | 380/210 |
| 2007/0177491 A1 | 8/2007 | Honda et al. | |
| 2008/0056663 A1 | 3/2008 | Tsujii et al. | |

(Continued)

FOREIGN PATENT DOCUMENTS

| | | |
|---|---|---|
| EP | 0766471 A1 | 4/1997 |
| JP | H08181966 A | 7/1996 |

(Continued)

OTHER PUBLICATIONS

Amon, P. et al. "File Format for Scalable Video Coding." IEEE Transactions on Circuits and Systems for Video Technology, vol. 17, No. 9, Sep. 2007.*

(Continued)

*Primary Examiner* — Brandon Hoffman
*Assistant Examiner* — Carlos Amorin
(74) *Attorney, Agent, or Firm* — Coats & Bennett, PLLC

(57) ABSTRACT

A method of handling media content comprises providing a set of one or more first layer data items that are to be accessible via a first media track. Each first layer data item is decodable to be rendered as a portion of the media content. Moreover, a set of one or more second layer data items is provided that are to be accessible via at least one second media track, each second layer data item being decodable to be rendered in combination with at least one decoded first layer data item as an enhanced portion of the media content. With each second layer data item a track reference index is associated that identifies the first media track via which the first layer data items are accessible. Then, the second layer data items and the associated track reference indices are encrypted for being transmitted to a content recipient.

29 Claims, 8 Drawing Sheets

(56) References Cited

U.S. PATENT DOCUMENTS

| | | | |
|---|---|---|---|
| 2009/0055417 A1* | 2/2009 | Hannuksela | 707/100 |
| 2010/0153395 A1* | 6/2010 | Hannuksela et al. | 707/737 |
| 2010/0250633 A1* | 9/2010 | Hannuksela et al. | 707/825 |
| 2011/0055550 A1* | 3/2011 | Jung et al. | 713/151 |
| 2012/0002728 A1* | 1/2012 | Eleftheriadis et al. | 375/240.16 |
| 2012/0008677 A1* | 1/2012 | Haskell | 375/240.02 |
| 2012/0250760 A1* | 10/2012 | Schwarz et al. | 375/240.03 |

FOREIGN PATENT DOCUMENTS

| | | |
|---|---|---|
| JP | H09182050 A | 7/1997 |
| JP | 2005196832 A | 7/2005 |
| JP | 2007013782 A | 1/2007 |
| JP | 2008060622 A | 3/2008 |
| WO | 03075524 A1 | 9/2003 |
| WO | 2004/036916 A1 | 4/2004 |
| WO | 2005122577 A1 | 12/2005 |
| WO | 2007069579 A1 | 6/2007 |
| WO | 2007081149 A1 | 7/2007 |
| WO | 2007/110283 A1 | 10/2007 |

OTHER PUBLICATIONS

Park. S.-W., et al. "Efficient Selective Encryption Scheme for the H.264/Scalable Video Coding (SVC)." Fourth International Conference on Networked Computing and Advanced Information Management, Piscataway, N J, USA, Sep. 2, 2008.*

ISO/IEC 14496-12. "Information technology—coding of audio-visual objects—Part 12: ISO base media file format", 3d edition Oct. 15, 2008, Ref No. ISO/IEC 14496-12:2008(E).*

Park. S.-W., et al. "Efficient Selective Encryption Scheme for the H.264/Scalable Video Coding (SVC)." Fourth International Conference on Networked Computing and Advanced Information Management, Piscataway, NJ, USA, Sep. 2, 2008.

Schwarz, H. et al. "Overview of the Scalable Video Coding Extension of the H264/AVC Standard." IEEE Transactions on Circuits and Systems for Video Technology, vol. 17, No. 9, Sep. 2007.

Wiegand, T. "Working Draft No. 2, Revision 2 (WD-2)." Joint Video Team (JVT) of ISO/IEC MPEG and ITU-T VCEG, Document JVT-B118r2, Geneva Switzerland, Jan. 29-Feb. 1, 2002.

* cited by examiner

```
class aligned(8) Extractor () {
    NALUnitHeader();
    unsigned int(8) track_ref_index;
    signed   int(8) sample_offset;
    unsigned int((lengthSizeMinusOne+1)*8)
        data_offset;
    unsigned int((lengthSizeMinusOne+1)*8)
        data_length;
}
```

TECHNIQUE FOR HANDLING MEDIA CONTENT TO BE ACCESSIBLE VIA MULTIPLE MEDIA TRACKS

TECHNICAL FIELD

The present disclosure generally relates to a technique for handling media content such as video, audio or multimedia content. In particular, the disclosure is directed to protecting media content that is to be accessible via multiple media tracks of a media file.

BACKGROUND

Modern media content distribution systems such as mobile video transmission systems are becoming increasingly popular. The underlying access networks are typically characterized by a varying connection quality and a wide range of terminal devices acting as recipients of the media content. The varying connection quality is, inter alia, a result of adaptive resource sharing mechanisms of these networks addressing the time varying data throughput requirements of a varying number of user terminal devices. As the terminal devices may range from mobile telephones with small screens and restricted processing power to high-end Personal Computers (PCs) with high-definition displays, the terminal devices will generally have different capabilities and requirements.

Bitstream scalability for media content is a desirable feature in such media content distribution systems. The need for scalability arises from graceful degradation transmission requirements and from adaptation requirements for spatial formats, bit rates or power, to name a few. To fulfill these requirements, it is beneficial to simultaneously transmit or store the media content in different spatial or temporal resolutions or qualities, which is the basis of bitstream scalability.

Scalable video coding (SVC) is one solution to the scalability needs posed by the characteristics of modern video transmission systems. The SVC standard as specified in Annex G of H.264/Advanced Video Coding (AVC) allows the construction of bitstreams that contain scaling sub-bitstreams conforming to H.264/AVC. H.264/AVC is a video compression standard equivalent to the Moving Pictures Expert Group (MPEG)-4 AVC (MPEG-4 AVC) standard.

The SVC standard encompasses various scaling approaches. For temporal bitstream scalability, i.e., the generation of a sub-bitstream with a smaller temporal sampling rate than the original bitstream, complete access units are removed from the bitstream when deriving the sub-bitstream. In this case, high-level syntax and inter prediction reference pictures in the bitstream are constructed accordingly. For spatial and quality bitstream scalability, i.e. the generation of a sub-bitstream with lower spatial resolution or quality than the original bitstream, Network Abstraction Layer (NAL) units are removed from the bitstream when deriving the sub-bitstream. In this case, inter-layer prediction, i.e., the prediction of the higher spatial resolution or quality bitstream based on information contained in the lower spatial resolution or quality bitstream, is typically used for efficient encoding.

In the SVC standard, the lower spatial resolution or quality sub-bitstream is also referred to as Base Layer (BL) sub-bitstream, while the higher spatial resolution or quality sub-bitstream is also referred to as Enhancement Layer (EL) sub-bitstream. It should be noted that in scenarios with multiple sub-bitstreams of different higher spatial resolution or quality, two or more EL sub-bitstreams may be provided in total.

Each image of an SVC video image sequence is represented as so-called "frame" (i.e., as an encoded representation of this image). Each SVC sub-bitstream is represented as a sequence of so called "sub-frames". Each SVC sub-frame constitutes either a full SVC frame or a fraction of a SVC frame. In other words, each SVC frame either is represented as a single data item (i.e., one BL "sub-frame" or one EL "sub-frame") or is sub-divided in at least two separate data items, i.e., in one BL "sub-frame" containing only the BL information associated with the respective frame and (at least) one EL "sub-frame" containing the EL information associated with the respective frame. In the SVC bitstream an EL sub-frame may temporally correspond to a certain BL sub-frame. If only the BL sub-frames are decoded, then the video content can be rendered at a basis resolution or quality (e.g., at Quarter Video Graphics Array, or QVGA, resolution). If, on the other hand, both the BL and the EL sub-frames are decoded, then the video content can be rendered at a higher resolution or quality (e.g., at VGA resolution).

The SVC file format for storing the sub-frames of the BL and EL sub-bitstreams is derived from the MPEG-4 file format. That is, each SVC media file is divided in a media data container and a track container (also called movie container). The media data container is used to store in so-called BL samples the sub-frames of the BL sub-bitstream ("BL samples") and in optional EL samples (at least) the sub-frames of one or more EL sub-bitstreams. The track container, on the other hand, specifies one or more media tracks, with each media track representing one media stream. Each media track contains references to a sequence of samples stored in the media data container (e.g., a time-to-sample table).

Using this SVC file format, access to different SVC layers and combinations of SVC layers can be indicated by use of multiple (i.e., at least two) media tracks. For instance, if the SVC encoded video content comprises a BL sub-bitstream and one EL sub-bitstream, then the media file would comprise a first media track representing the BL sub-bitstream only ("BL track"), while a second media track would represent both the BL and the EL sub-bitstream ("EL track").

There exist two strategies to store the SVC encoded video information in the media data container, which can be referred to as the "efficient strategy" and the "inefficient" strategy. According to both strategies, the BL sub-frames are stored as distinct BL samples in the media data container, and these samples are referenced by the BL track. The inefficient strategy and the efficient strategy differ in the way the EL samples containing the EL sub-frames are organized in relation to the corresponding BL sub-frames.

According to the inefficient strategy, BL sub-frames and EL sub-frames corresponding to a specific point in time (i.e., constituting a specific frame) will both be stored in the same EL sample. These samples are then referenced in their specific sequence in the EL track. Since the BL sub-frames referenced in the BL track are additionally stored in distinct BL samples, they have in fact to be replicated within the media data container. This replication results in an inefficiency as regards memory usage.

If the efficient strategy is used, then the BL sub-frames are not replicated to be encapsulated together with EL sub-frames in the corresponding EL samples referenced in the EL track. Rather, each sample containing an EL sub-frame is provided with a track reference index in a so-called "extractor". The track reference index in the extractor refers to the BL track and thus allows to identify the BL sample in the media container that contains the BL sub-frame temporally associated with the specific EL sub-frame. As in the inefficient strategy, the samples containing the EL sub-frames are referenced in the EL track. The associated BL sub-frames are thus determined by dereferencing the extractors in the EL samples. To this end, additional meta information (the so-called "'scal' type track references") is stored in the track container. By reading the track reference index included in the extractor and looking up the associated BL track reference using the meta information, the BL track can be determined. Then, in a next step, the BL sample containing the temporally associated BL sub-frame can be found using the time-to-sample table of the BL track.

In order to control the consumption of media content such as SVC encoded video content, Digital Rights Management (DRM) techniques may be employed. Generally, DRM techniques rely on encrypting the media content to control its consumption. For this reason, it has been investigated if media content encryption would also be feasible to protect SVC encoded media content. In this connection it has been found that problems arise in case the decryption key is not available to (or not usable or processable by) the media content recipient at the time the encrypted media content is received.

Specifically, the receiving terminal device cannot store the encrypted EL sub-bitstream using the efficient strategy described above since the terminal device cannot (or at least not efficiently) add the extractors to the encrypted EL sub-frames to construct the EL samples. The problems are even more pronounced in case the BL and EL sub-bitstreams are encrypted using different encryption keys. In such a situation, also the inefficient strategy can not (or at least not efficiently) be employed since different decryption keys would be required to decrypt one EL sample.

SUMMARY

Accordingly, a technique is needed for protecting media content that is to be accessible via multiple media tracks.

According to a first aspect, a method of handling media content that is to be accessible via multiple media tracks of a media file is provided. The method comprises providing a set of one or more first layer data items that are to be accessible via a first media track, each first layer data item being decodable to be rendered as a portion of the media content; providing a set of one or more second layer data items that are to be accessible via at least one second media track, each second data layer item being decodable to be rendered in combination with at least one decoded first layer data item as an enhanced portion of the media content; associating with each second layer data item a track reference index allowing to identify the first media track via which the first layer data items are accessible; and encrypting at least the second layer data items and the associated track reference.

According to a further aspect, a method of handling media content that is to be accessible via multiple media tracks of a media file is provided comprising receiving a set of one or more first layer data items, each first layer data item being decodable to be rendered as a portion of the media content; storing the first layer data items to be accessible via a first media track of the media file; receiving a set of one or more encrypted second layer data items, each second layer data item being decodable to be rendered in combination with at least one decoded first layer data item as an enhanced portion of media content, wherein the encrypted second layer data items are received together with associated encrypted track reference indices allowing to identify the first media track with the first layer data items; and storing the encrypted second layer data items together with the encrypted track reference indices to be accessible via at least one second media track.

As understood herein, media content includes various content types, including video content, audio content, multimedia content, and so on.

The track reference index may allow a direct or indirect identification of the first media track via which the first layer data items are accessible. An indirect identification may occur, for example, via one or more intermediate track reference indices (i.e., via one or more intermediate media tracks), with the last intermediate track reference index pointing to the first media track via which the first layer data items are accessible.

According to one variant, the individual layers are hierarchically structured in the sense of one base layer and one or more enhancement layers (e.g., the decoded data items of a particular enhancement layer may only be rendered in combination with the base layer data items and the data items of zero, one or more enhancement layers of an intermediate hierarchy level). In the case of multiple enhancement layers, the enhancement layers may among themselves also have a hierarchy. Moreover, the track reference indices associated with data items of an upper enhancement layer may in such a case allow to identify the media track via which data items of the next lower enhancement layer are accessible, and so on. The data items of the lowest enhancement layer may finally be associated with track reference indices allowing to identify the media track via which the base layer data items are accessible.

In another variant, the individual layers have no hierarchical but a flat structure. A flat layer structure can, for example, be realised by so-called Multiple Description Coding (MDC). In an MDC scenario the layers are mutually refining but can be decoded and rendered either singly (e.g., with a lower quality or resolution) or jointly (e.g., with an enhanced quality or resolution).

As stated above, a second layer data item can be decodable to be rendered in combination with at least one decoded first layer data item as an enhanced portion of media content. As an option, the second layer data item may additionally be decodable to be rendered not in combination with at least one decoded first layer data item, e.g. to be rendered individually.

In general, there may exist several sets of first and second layer data items. For example, there may exist a first set of one or more second layer data items that are decodable to be at least rendered in combination with one or more decoded first layer data items each (and that are thus associated with a track reference index each), and an additional second set of one or more second layer data items each of which being solely intended to be decoded to be rendered individually (and thus not associated with any track reference index). In a corresponding manner, different sets of first layer data items may be defined.

There exist various possibilities for storing the data items. According to a first option, the data items may be stored directly in the respective media tracks. As a second option, the data items may be stored in the same media file as the media tracks but logically separated from the media tracks (e.g., in a media data container of the media file). As a still further option, the tracks are stored in at least one first media file and the data items are stored in at least one separate second media file that is different from the first media file containing the media tracks. The second media file (i.e., the data items) may be co-located with the first media file (i.e., the media tracks) on one and the same user terminal. Alternatively, at least one of the first media file and the second media file is stored in an external storage accessible to the user terminal via a cable, a wireless link or a network connection. These and further options may be combined as needed in relation to storing the data items of different layers.

In one implementation, the technique discussed herein further comprises generating track layout information indicative of an arrangement of at least the first media track in the media file. The track layout information may optionally also be indicative of an arrangement of the second and any further media track in the media file. The track layout information can include instructions controlling the arrangement of at least the first media track in the media file (e.g., upon creation or modification of the media file by a recipient of the media content). The track reference indices that are to be associated with the second layer data items may be generated in accordance with the track layout information.

The media content may be distributed to one or more content recipients using a unicast, multicast or broadcast connection. Moreover, the media content may be delivered via one or more media streams. In one implementation, a first media stream comprising the first layer data items and a second media stream comprising the encrypted second layer data items together with the encrypted track reference indices are created. The first layer data items may be transmitted to the recipient of the media content in a non-encrypted or in an encrypted form. In the latter case, the first media stream will thus comprise the encrypted first layer data items.

The media streams may be transmitted by establishing, for example, for each media stream a separate Real Time Transport Protocol (RTP) or other session with the recipient of the media content. In one configuration, the track layout information is transmitted in a media stream. In an alternative configuration, the track layout information is transmitted separately from the one or more media streams (i.e., "out-of-band").

Especially, but not exclusively, in cases in which the first media stream comprises non-encrypted first layer data items, the generation of the first media stream may comprise converting the first layer data items from an initial format into a first layer format different from a second layer format of the second layer data items. The initial format may be the second layer format or any format compatible therewith.

Alternatively, generating the second media stream may comprise converting the second layer data items from an initial format (e.g., from the first layer format or any format compatible therewith) into the second layer format different from the first layer format. The second layer format may, for example, be an encryption protocol format. The first layer format, on the other hand, may be a legacy format not compatible with the encryption protocol format.

The first layer data items and the second layer data items (together with the track reference indices) may be encrypted using one and the same encryption key. Alternatively, the first layer data items are encrypted with a first encryption key, and the second layer data items (together with the track reference indices) are encrypted with a second encryption key different from the first encryption key. In yet another alternative, the first layer data items and the second layer data items may be encrypted with first and second encryption keys (which can be different or identical), respectively, and the track reference indices may be encrypted with a third encryption key different from the first and second encryption keys.

The technique described herein may further comprise providing (e.g., from the perspective of the second method aspect, receiving or retrieving) track layout information controlling the arrangement of at least the first media track in the media file. In the media file, the data items may be stored outside the media tracks, with the media tracks containing references to the data items indicative of a sequence in which the data items are to be rendered. For example, the first media track of the media file may contain references to the first layer data items, and the second media track of the media file may contain references to the second layer data items. The second media track may additionally be associated with information (such as a look-up table) pointing to the first media track that references the first layer data items.

The second method aspect may also comprise decrypting at least the encrypted second layer data items and the encrypted track reference indices. If the first layer data items are received in an encrypted form, the encrypted first layer data items may be decrypted also.

In one scenario, at least one decryption key is received from an external source. The decryption key may be received before or after the encrypted second layer data items (together with the encrypted track reference indices) have been stored. In case the first layer data items are encrypted also, different decryption keys may be required for decrypting the encrypted first layer data items on the one hand and the encrypted second layer data items and the encrypted track reference indices on the other. Moreover, the encrypted second layer data items and the encrypted track reference indices may need to be decrypted using different decryption keys.

The technique discussed herein may further comprise reading at least one of the media tracks, and rendering the decoded media content accessible via the at least one media track that is being read. In one scenario, the accessible media content corresponds to the first layer data items. In other words, the first media track may be read to identify those first layer data items that are to be read in a next step for being decoded and rendered. In another scenario, the accessible media content corresponds to a combination of the first layer data items and the second layer data items. In other words, the second media track may be read to identify the second layer data items and, for example via a pointer to the first media track, the associated first layer data items, so that in a next step the first and second layer data items can be read for being decoded and rendered jointly.

The first layer data items may be received (e.g., in a non-encrypted form) via a first media stream in a first layer format and the encrypted second layer data items and the encrypted track reference indices may be received via a second media stream in a second layer format not compatible with the first layer format. In such a case, the method may further comprise the step of converting the first layer data items into a format compatible with the second layer format. The second layer format may, for example, be an encryption protocol format.

In addition, or as an alternative, to decoding and/or rendering the media content, the recipient of the data items may store (at least temporarily) and forward the data items and track reference indices to another recipient. Such a forwarding, may, for example, comprise the steps of generating at least one media stream comprising at least one of the (encrypted or non-encrypted) first layer data items, the encrypted second layer data items and the encrypted track reference indices. The one or more media streams thus generated may in a further step be transmitted to the further recipient.

According to another aspect, a computer program product is provided. The computer program product comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

According to a further aspect, a device for handling media content that is to be accessible via multiple media tracks of a media file is provided. The device comprises a first unit configured to provide a set of one or more first layer data items that are to be accessible via a first media track, each first layer data item being decodable to be rendered as a portion of the media content; a second unit configured to provide a set of one or more second layer data items that are to be accessible via at least one second media track, each second layer data item being decodable to be rendered in combination with at least one decoded first layer data item as an enhanced portion of the media content; a track reference index module configured to associate with each second layer data item a track reference index allowing to identify the first media track via which the first layer data items are accessible; and an encryption module configured to encrypt at least the second layer data items and the associated track reference indices.

According to a still further aspect, a device for handling media content that is to be accessible via multiple media tracks of a media file comprises an input interface configured to receive a set of one or more first layer data items and a set of one or more encrypted second layer data items together with associated encrypted track reference indices, wherein each first layer data item is decodable to be rendered as a portion of the media content and each second layer data item is decodable to be rendered in combination with at least one decoded first layer data item as an enhanced portion of the media content; and a data storage configured to store the first layer data items to be accessible via a first media track of the media file, and to store the encrypted second layer data items together with the encrypted track reference indices to be accessible via at least one second media track of the media file.

The latter device may further comprise a decryption module configured to decrypt at least the encrypted second layer data items and the encrypted track reference indices. Alternatively, or in addition, the device may comprise a rendering module configured to read at least one of the media tracks and to render to the decoded media content accessible via the at least one media track that is being read.

A streaming module may be provided also. The streaming module is configured to generate at least one media stream comprising at least one of the first layer data items (in either an encrypted or a non-encrypted form), the encrypted second layer data items as well as the encrypted track reference indices.

BRIEF DESCRIPTION OF THE DRAWINGS

In the following, the present invention will be described in more detail with reference to exemplary embodiments illustrated in the drawings, wherein FIG. 1 schematically illustrates a media content distribution system comprising a media server embodiment and a media client embodiment.

DETAILED DESCRIPTION

In the following description, for purposes of explanation and not limitation, specific details are set forth, such as specific device configurations and specific streaming scenarios in order to provide a thorough understanding of the techniques disclosed herein. It will be apparent to one skilled in the art that the techniques may be practised in other embodiments that depart from these specific details. Moreover, while the following embodiments will primarily be described in relation to the video coding standard SVC and the encryption standard ISMACryp, it will be readily apparent that the techniques described herein may also be practised in context with other encoding and encryption protocols. Furthermore, while in the following reference will be made to MPEG 4 compatible file formats and RTP sessions, the techniques discussed herein can also be implemented using other file formats and transport protocols.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the techniques disclosed herein may also be embodied in a computer processor and a memory coupled to the processor, wherein the memory stores one or more programs that perform the steps discussed herein when executed by the processor.

Figure 1:
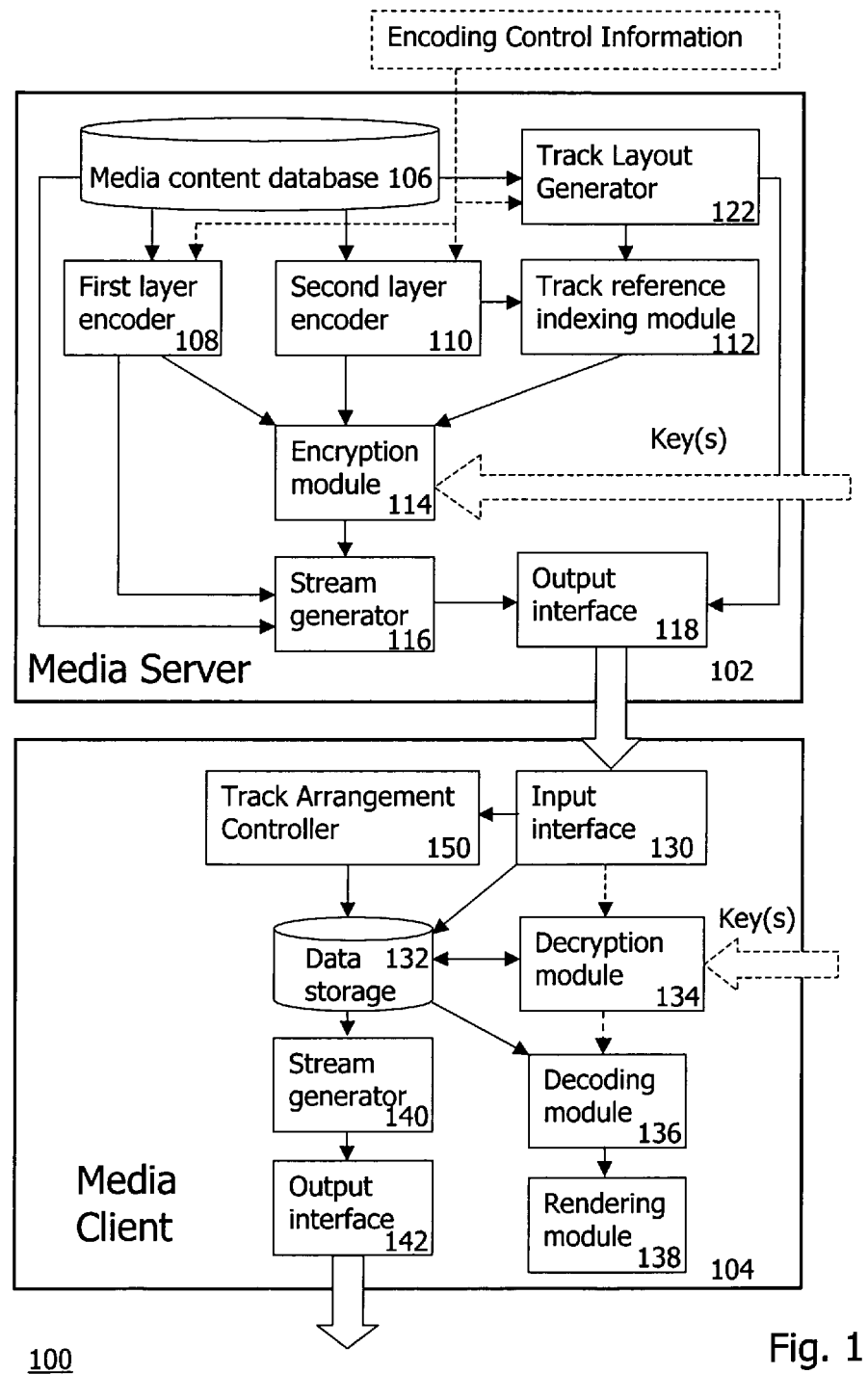

Reference is now made to FIG. 1, which shows an embodiment of an exemplary media content distribution system 100 comprising a media server 102 as well as a media client 104 receiving media content from the media server 102. While the system 100 of FIG. 1 illustrates only a single media client 104, it will be appreciated that the media server 102 will in practise be configured to distribute media content to a plurality of media clients 104. Also, each media client 104 may be configured to receive media content from more than one media server 102.

The media server 102 comprises a media content database 106 for storing media content files. In the present embodiment, the media content files are video files compliant with a mobile television standard. It will be appreciated that in alternative embodiments, the media content files could also be audio files or multimedia files.

Optionally, the media server 102 further comprises an input interface (not shown) for receiving the media content files. The received media content files may then be stored in the database 106 and retrieved at a later point in time. Alternatively, the received media content files may only be temporarily buffered in the database 106 or may even bypass the database 106, e.g. for live content.

The media server 102 further comprises at least two encoders 108, 110 for encoding the media content files included in the media content database 106 or received via the input interface. If the media files are provided to the two encoders 108, 110 in compressed form, the operations performed by the two encoders 108, 110 may comprise a decompression operation for generation of an intermediate uncompressed representation of the video. Alternatively or additionally, the operations performed by the two encoders 108, 110 may comprise transcoding operations.

Each encoder 108, 110 generates a dedicated sub-bitstream corresponding to a dedicated media content rendering layer, and each sub-bitstream comprises a continuous sequence of individual data items (e.g., subframes). The operation of the encoders 108, 110 is controlled by encoding control information (including information on the number and dependency of layers the SVC encoded media content will have), which is provided to the media server 102 from an external controller as shown in FIG. 1. Alternatively, the encoding control operation can be generated by an in internal controller (not shown) of the media server 102.

The data items generated by the encoders 108, 110 are to be stored by the media client 104 such that data items pertaining to a specific media layer are accessible via a dedicated media track of a media file. The data items generated by the first layer encoder 108 are decodable to be rendered as a portion (e.g., an image or an image sequence) of the media file. The data items generated by the second layer encoder 110, on the other hand, are decodable to be rendered in combination with at least one decoded first layer data item as an enhanced portion of the media content. The enhanced portion may, for example, be rendered at a higher quality, a higher sampling rate or a higher resolution compared to the media content portion that is rendered solely on the basis of a first layer data item. It should be noted that the second layer data items may additionally be decodable to be rendered singly as a non-enhanced portion of the media content. It should also be noted that the second layer encoder 110 may also generate a set of one or more data items that are solely intended for being rendered singly.

As has been explained above, the individual data items output by the different encoders 108, 110 are to be accessible for the media client 104 via different tracks of a media file. Since at least some of the second layer data items output by the encoder 110 are decodable to be rendered in combination with at least one decoded first layer data item, it is advantageous to associate with such a second layer data item a track reference index allowing the media client 104 to identify the first media track via which the first layer data items are accessible. For this reason, the media server 102 comprises a track layout generator 122 and a track reference indexing module 112.

The track layout generator 122 is fed with encoding control information (including information on the number and dependency of layers the SVC encoded media content will have). Using this information, the track layout generator 122 defines the track layout for the specific media file that will be generated by the media client 104 for the encoded media content. Based on this definition, the track layout generator 122 generates the corresponding track layout information (e.g., in an exemplary SVC scenario, the information typically intended for storage in the 'scal' meta information portion of the respective track). The track layout information additionally includes information on how the mapping of media streams to media tracks will be done by the media client 104. The track layout information is fed to the stream generator 116 (or, as shown in FIG. 1, to an output interface 118) for transmission to the media client 104. It is also fed to the track reference indexing module 112.

The track reference indexing module 112 is configured to associate (e.g., to add, append, concatenate or include) with each second layer data item intended to be rendered in combination with at least a first layer data item a dedicated track reference index based on the track reference layout generated by the track reference layout generator 122. The track reference index allows the media client 104 to identify the first media track via which the first layer data items are accessible.

It will be appreciated that second layer data items that are intended to be rendered only singly will not necessarily have to be associated with track reference indices. Moreover, it will be apparent that the content of the track reference indices may be identical for some or all second layer data items. The track reference indices will generally have different contents in scenarios with three or more layers as will be discussed in more detail with reference to FIG. 8 below.

The first layer data items output by the first layer encoder 108 as well as the second layer data items with their associated track reference indices output by the track reference indexing module 112 are input to an encryption module 114. The encryption module 114 may further be fed directly by the second layer encoder 110 with second layer data items that are to be rendered only singly (and therefore have not been associated with track reference indices). The encryption module 114 is configured to encrypt the first layer data items, the second layer data items and the track reference indices using one or more encryption keys that may be stored locally or that may be obtained from an external key source.

In one implementation, the first layer data items, the second layer data items and the track reference indices are encrypted using one and the same encryption key. In another implementation, the first layer data items are encrypted using a first encryption key and the second layer data items and the track reference indices are encrypted using a second encryption key different from the first encryption key. The second layer data items and the track reference indices may be encrypted jointly or separately. In case the second layer data items and the track references are encrypted separately, different encryption keys may be used. In the following, it will be assumed that the first layer data items are encrypted with a first encryption key and the second layer data items and the track reference indices are jointly encrypted using a second encryption key different from the first encryption key.

The encryption module 114 is coupled to a stream generator 116 so that the encrypted first layer data items, the encrypted second layer data items and the encrypted track reference indices can be output to the stream generator 116 for generating one or more media streams. As shown in FIG. 1, the stream generator 116 is additionally coupled directly to the output of the first layer encoder 108.

The stream generator 116 has two different modes of operation. In a first operational mode, it generates one or more data streams comprising the first layer data items in an unencrypted form as well as the encrypted second layer data items and the encrypted track reference indices. In a second operational mode, the stream generator 116 generates one or more media streams comprising the encrypted first layer data items, the encrypted second layer data items and the encrypted track reference indices. It should be noted that the stream generator 116 could alternatively be configured to be operable in only one of these modes.

The one or more media streams output by the stream generator 116 are fed to the output interface 118 of the media server 102. In the case of "out-of-band" transmission, track layout information as generated by the track layout generator 122 is separately fed to the output interface 118. The output interface 118 is configured to establish a media session with the media client 104 via a unicast, multicast or broadcast connection. Furthermore, the output interface 118 can also be configured to transmit the track layout information generated by the track layout generator 122 to the media client 104 via a unicast, multicast or broadcast connection.

As mentioned above, the track layout information can either be transmitted in a media session, or it can be transmitted separately ("out-of-band"), e.g. using the Session Description Protocol (SDP). It should be noted that transmission of track layout information may be omitted in case the media client 104 has obtained the track layout information in a different manner. For example, the track layout information could be pre-negotiated between the media server 102 and the media client 104 or simply be pre-defined such that the media client 104 is already aware of the track layout information before having initiated any communication with the media server 102.

In a unicast scenario, the media server 102 will have a dedicated communication link with one media client 104 as shown in FIG. 1. In a multicast or broadcast scenario, one or more additional media clients 104 will be coupled to the media server 102.

Each media stream output by the output interface 118 to the one or more media clients 104 may be a separate RTP stream. Typically, the output interface 118 adds headers to the media stream such as Internet Protocol (IP) headers, User Datagram Protocol (UDP) headers or RTP headers for the transmission to the media client 104.

Turning now to the media client 104 of FIG. 1, the one or more media streams distributed by the media server 102 are received at an input interface 130. Typically, the input interface 130 removes headers from the one or more media streams such as IP headers, UDP headers and RTP headers used for the transmission from the media server 102 to the media client 104. Additionally, the track layout information as generated by the track layout generator 122 may be received at the input interface 130.

The input interface 130 is coupled to a data storage 132 and a track arrangement controller 150. The data storage 132 is configured to store the encrypted or not encrypted first layer data items, the encrypted second layer data items and the encrypted track reference indices in such a manner that the various data items will be accessible via different tracks of a media file. The data storage 132 may further be configured to store track layout information generated by the track layout generator 122.

The track arrangement controller 150 is configured to control the arrangement of at least the first media track in the media file. Specifically, it controls the storage of the first layer data items such that they are accessible via the first media track of the media file. The encrypted second layer data items together with the encrypted track reference indices are stored to be accessible via at least one second media track of the media file. Hence, storing is possible without usage of decryption keys. In an exemplary SVC scenario, the track layout information would be stored in the 'scal' meta information portion of the media file.

The media client 104 further comprises a decryption module 134 to decrypt the encrypted data items and the encrypted media track references. The decryption module 134 may either be directly coupled to the input interface 130 in case a direct rendering of the media content is desired or, in the alternative, to the data storage 132 in case a delayed rendering is desired. The decryption module 134 has access to one or more decryption keys that are either stored locally or obtained from an external key source.

Generally speaking, the decryption module 134 performs the opposite operations of the encryption module 114 applying either a single decryption key or two or more different decryption keys depending on the specific encryption modalities. The decryption module in any case decrypts the encrypted second layer data items together with the encrypted track reference indices. If the first layer data items are encrypted, the decryption module 134 decrypts the first layer data items also. Otherwise, the first layer data items may bypass the decryption module 134.

The decrypted or unencrypted data items are then passed to a decoding module 136. The decoding module 136 is adapted to decode the data items in a sequence controlled by a selected media track. Upon reading the selected media track, the track reference indices associated with individual second layer data items are evaluated also to identify the media track in which the first layer data items required for an enhanced rendering of the media content are accessible. The decoded data items are then passed in their correct sequence from the decoding module 136 to a rendering module 138 for being rendered to be output by at least one output unit (not shown). The output unit (e.g., a display and/or a loudspeaker) may be part of the media client 104 or connectable to the media client 104.

The media client 104 is also configured to fulfill itself the function of a media server. To this end, the media client 104 comprises a stream generator 140 coupled to the data storage 132. The stream generator 140 is configured to generate at least one media stream comprising the first layer data items (either in an encrypted or a non-encrypted form), the encrypted second layer data items and the encrypted track reference indices. In one configuration, the stream generator 140 generates a first media stream comprising the first layer data items and a second media stream comprising the encrypted second layer data items together with the encrypted track reference indices as read from the data storage 132. The media streams may then be output via an output interface 142 of the media client 104 to a further media client (not shown). Hence, the media client 104 can act as a media server without usage of decryption keys.

In the embodiment described above with reference to FIG. 1, the track reference indices are not generated by the media client 104 upon receipt of the data items immediately before creating the media file. Instead, the track reference indices are already generated by the media server 102 and encrypted together with the associated second layer data items prior to being transmitted to the media client 104. This approach facilitates the implementation of the cryptographic process as the data items can be stored by the media client 104 in an encrypted form and in a manner compliant with conventional file formats (such as MPEG-4 compliant file formats). In other words, it is not necessary to decrypt the individual data items prior to storing them in the target file format as the track reference indices have been pre-generated by the media server 102.

Several details and further advantages of this approach will now exemplarily be described in the context of an SVC scenario in which media content protection is realized using the ISMACryp 1.0 or 2.0 protocol. According to the ISMACryp specifications, each of the SVC layers is separately content protected by a dedicated encryption key and transmitted in a separate RTP media stream as illustrated in FIG. 2.

Figure 2:
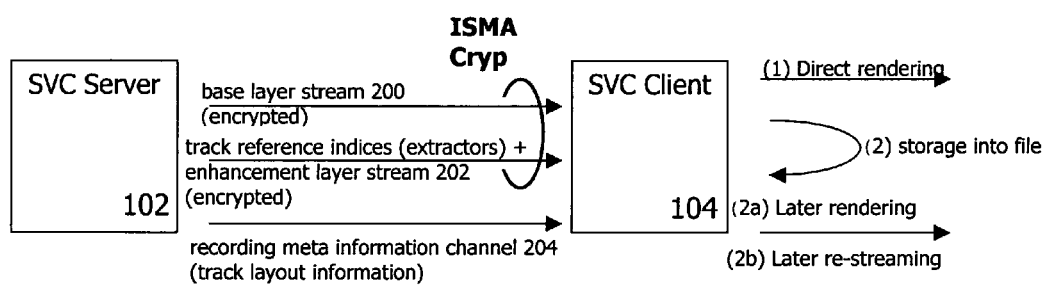
FIG. 2 schematically illustrates a transmission of media streams from a media server to a media client in an SVC embodiment.

FIG. 2 shows the media content distribution from an SVC server 102 to an SVC client 104. The internal configurations of the SVC server 102 and SVC 104 are not shown in FIG. 2 but may generally correspond to the configurations of the media server 102 and the media client 104, respectively, of FIG. 1.

As illustrated in FIG. 2, two dedicated RTP media streams 200, 202 stretch from the output interface of the SVC server 102 to the input interface of the SVC client 104. A first media stream 200 contains the BL sub-frames encrypted with a first encryption key, while the second media stream 202 comprises the track reference indices (included in SVC extractors) and the EL sub-frames. The extractors and the EL sub-frames have jointly been encrypted with a second encryption key different from the first encryption key used to encrypt the BL sub-frames. The encryption is performed in an ISMACryp compliant way.

As can be gathered from FIG. 2, there additionally extends a recording meta information channel 204 between the SVC server 102 and the SVC client 104. The channel 204 is used to signal track layout information out-of-band to the SVC client 104. The track layout information is indicative of the arrangement of the BL and EL media tracks in the media file that is to be generated by the SVC client 104 for storing the media content received via the media streams 200, 202. The track layout information basically controls how the individual media tracks are to be arranged in the media file to be compliant with the track reference indices transmitted via the encrypted extractors via media stream 202.

It should be noted that the recording meta information channel 204 is optional. For example, the track layout information could also be transmitted in-band via one or both of the media streams 200, 202. Moreover, the track layout information could also be pre-negotiated between the SVC server 202 and the SVC client 104 or simply be pre-defined such that the SVC client 104 is already aware of the track layout information before having initiated any communication with the SVC server 102.

Figure 3:
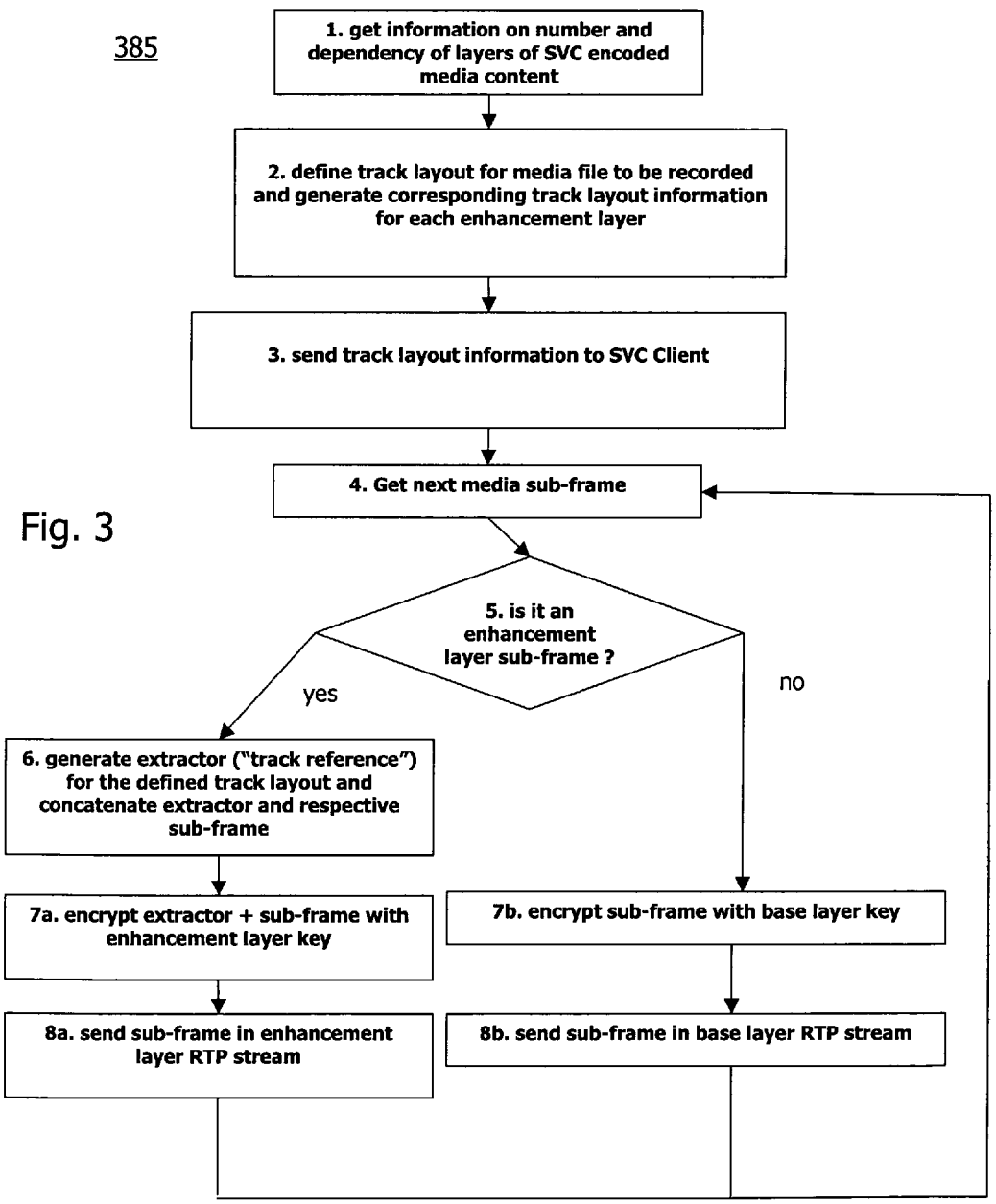
FIG. 3 is a schematic flow chart illustrating a method embodiment of an operation of a media server.

The BL stream 200 and the EL stream 202 are generated by the SVC server 102 as will now discussed with reference to the flow chart 385 of FIG. 3.

In a first step, the SVC server 102 obtains information on the number and dependency of layers of the SVC encoded media content (as output by the encoders 108 and 110 of FIG. 1). In the present case, a two layer scenario including a BL and one EL will be considered. Then, in a second step, the SVC server 102 defines (or is informed about) the track layout for the media file that will be generated by the SVC client 104 for the SVC encoded media content. The SVC server 102 also generates the corresponding track layout information (i.e., the information typically contained in the 'scal' meta information portion of the respective track). The track layout information additionally includes information on how the mapping of media streams to media tracks is to be done. In a third step the track layout information is sent via the recording meta information channel 204 to the SVC client 104. The track layout information may, for example, be transmitted using SDP. It should be noted that steps 1 to 3 may be omitted in case the SVC client 104 has obtained the track layout information in a different manner.

Then, in the fourth step, the encryption module 114 of the SVC server 102 fetches the first or any following media sub-frame from the encoders 108, 110 and decides in the fifth step whether the fetched sub-frame is an EL sub-frame. Should this be the case, in a sixth step an extractor (including a track reference index) is generated based on the track layout defined in the second step. Additionally, the extractor and the respective EL sub-frame are concatenated. Then, in step 7a, the extractor and the EL sub-frame are jointly encrypted with an EL encryption key. Once the encryption has taken place, the encrypted EL sub-frame is sent together with the encrypted extractor via the EL stream 202 to the SVC client 104. If, on the other hand, it is determined in the fifth step that the sub-frame is no EL sub-frame (Le., that the subframe is a BL sub-frame), then the SVC server 102 proceeds with encrypting this sub-frame with the BL encryption key (step 7b) and sending the encrypted sub-frame via the BL stream 200 to the SVC client 104 (step 8b). From step 8a or step 8b, the process loops back to the fourth step, in which the SVC server 102 gets the next media sub-frame to be transmitted.

Upon receipt of the two media streams 200, 202 (and the optional track layout information), there exist two major use-cases for handling the media content by the SCV client 104. As illustrated in FIG. 2, the first use-case pertains to a direct rendering of the media content, and the second use-case is the storage of the media content for later rendering or later re-streaming. Both use-cases have already been briefly discussed in context with the rendering module 138 and the stream generator 140 of the media client 104 shown in FIG. 1.

In the case of direct rendering, the SVC client 104 needs immediate access to the decryption keys required to decrypt the encrypted information distributed via the media streams 200, 202. The way how the SVC client 104 obtains these decryption keys is typically governed by a Digital Rights Management (DRM) or Conditional Access (CA) system and out of the scope of the present disclosure.

Once decrypted, the decoding and direct rendering of the BL sub-frames does not differ from existing SVC solutions. The main difference to existing solutions is the fact that the EL stream 202 additionally contains, besides the encrypted EL sub-frames, (encrypted) extractors carrying the track reference indices. However, according to the SVC specifications an extractor has the same structure as a regular SVC NAL unit, with a header code that is unspecified in the SVC standard. For this reason, the decrypted extractors will simply be ignored and discarded during the decoding operation. As a result, only the EL sub-frames will be decoded and passed on to the rendering process. In other words, in the case of direct rendering, track layout information will not be required and, even if available to the SVC client 104, may simply be disregarded.

As an alternative, or in addition, to a direct rendering of the media content received via the media streams 200, 202, the media content may be stored as one or more media files in an internal data storage of the SVC client 104 (see data storage 132 of FIG. 1) or in an external data storage accessible by the SVC client 104 via a wireless or wired (e.g. network) connection. Storing the media content will be the only feasible use-case if the one or more keys necessary to decrypt the media content are not yet available upon receipt of the media streams 200, 202. The keys may, for example, not become available after storing of the media data has begun. Moreover, the media client 104 may also act as a media server temporarily buffering the media data for being forwarded later on to another media recipient. In the latter case the media client 104 may never have access to the decryption keys required to decrypt the media content.

Figure 4:
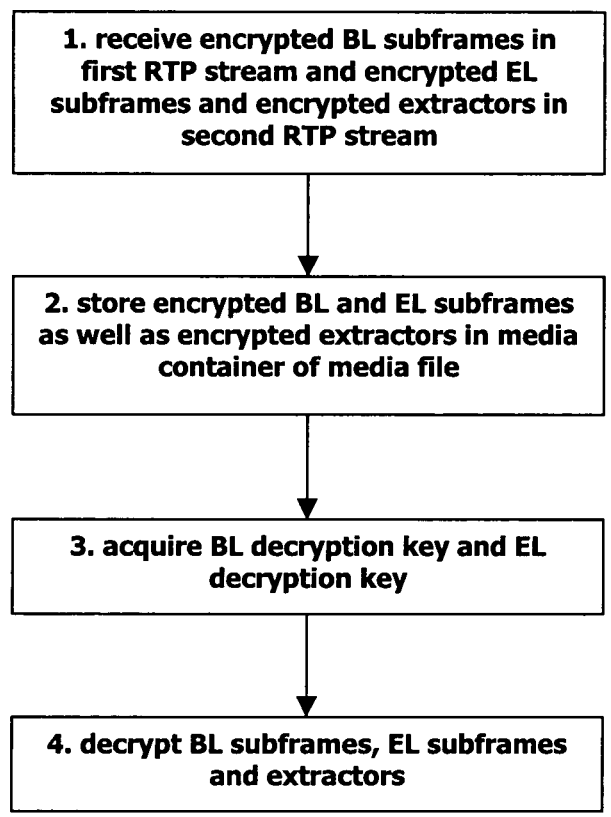
FIG. 4 is a schematic flow chart illustrating a method embodiment of an operation of a media client.
Figures 5, 6:
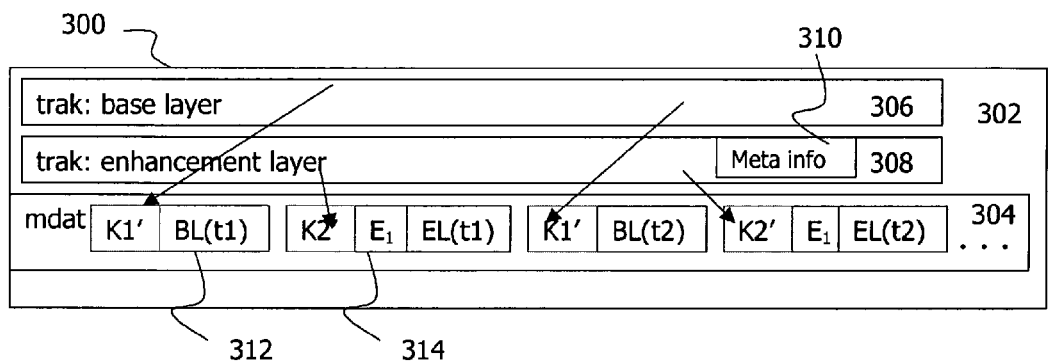
FIG. 5 is a schematic diagram illustrating a media file in a two-layer media content embodiment and its processing by a media client.
FIG. 6 schematically illustrates components of an extractor embodiment.

The encrypted media content (including the extractors) will be stored and decrypted by the SVC client 104 as generally illustrated in the flowchart 400 of FIG. 4. The storing will occur in a media file 300 as shown in FIG. 5. The media file 300 has a file format compliant with MPEG-4 specifications. Specifically, as shown in FIG. 5 and generally known in the art, the media file 300 comprises a track container 302 and a media data container 304. In the present embodiment of media content transmitted via a base layer and a single enhancement layer, two media tracks 306, 308 will be arranged in the track container 302 upon creation of the media file 300 by the SVC client 104.

The arrangement of the two media tracks 306, 308 in the track container 302 is controlled by the track layout information received via the recording meta information channel 204 illustrated in FIG. 2 (or otherwise available to the SVC client 104). In essence, the track layout information indicates within the media file 300 the location of the media track 306 referencing the BL samples. The second media track 308 is configured to reference the EL samples and includes a meta information portion 310 that has been created taking into account the track layout information and that comprises the so-called 'scal' type track reference pointing to the BL track 306.

The media content received via the media streams 200, 202 (see first step in FIG. 4) is stored in the media container 304 in the form of distinct BL samples 312 and distinct EL samples 314. It is important to note that in the present embodiment the samples stored in the media data container 304 are encrypted (see second step in FIG. 4). This fact also becomes apparent from the respective ISMACryp headers K preceding the BL and EL sub-frames in the BL and EL samples 312, 314. As indicated by the arrows in FIG. 5, the BL track 306 contains consecutive references to a plurality of BL samples indicating the sequence in which the decoded sample content is to be rendered. In a similar manner, the EL track 308 comprises references to the EL samples 314.

As has become apparent from the above explanations and from the configuration of the EL samples 314 shown in FIG. 5, the EL samples 314 are stored in the media data container 304 in accordance with the "efficient" strategy. That is, an individual EL sample 314 comprises a single EL sub-frame, but not the corresponding BL sub-frame that is to be rendered in combination with the EL sub-frame as an enhanced portion of the media content. Rather, each EL sample 314 comprises an extractor $E_1$. The extractor is a data structure as illustrated in FIG. 6 comprising, inter alia, a track reference index parameter ("track_ref_index"). The track reference index parameter allows to identify, via the meta information portion 310 of the EL track 308, the location of the BL track 306 and thus the corresponding BL sample 312 as will now be described in more detail with reference to FIG. 7.

Figure 7:
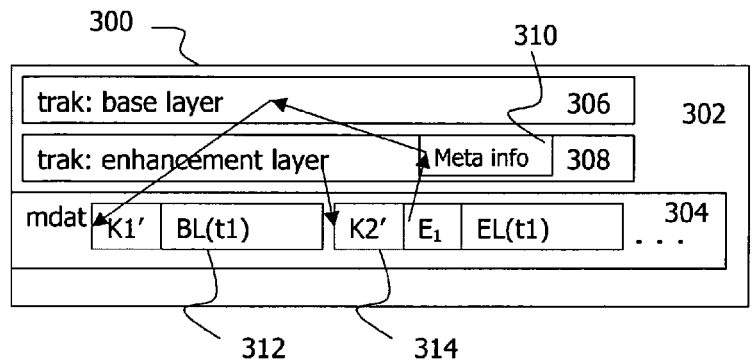
FIG. 7 is a schematic diagram illustrating a media file in a two-layer media content embodiment and its processing by a media client.

FIG. 7 illustrates the reading of the EL sample 314 corresponding to an EL sub-frame at time t1. Initially, the SVC client 104 obtains the BL and EL decryption keys (see third step in FIG. 4). Then, the SVC client 104 reads and decrypts (see fourth step in FIG. 4) the EL sample 314, i.e., the extractor $E_1$ and the EL sub-frame EL(t1). In a next step, the SVC client 104 reads the "track_ref_index" parameter from the extractor $E_1$ (see FIG. 6). Then, the meta information portion 310 of the EL track 308 is read to determine the track reference corresponding to the specific "track_ref_index" parameter included in the extractor $E_1$. The track reference points to the location of the BL track 306 in the media file 300 as defined in the track layout information. In a further step, the SVC client 104 reads from the BL track 306 the time-to-sample table for time t1 to determine the corresponding BL sample 312 as stored in the media data container 304. This BL sample 312 is then read and decrypted in a further step (see fourth step in FIG. 4).

As a result of this procedure, both the EL sub-frame included in the EL sample 314 as well as the temporally corresponding BL sub-frame stored in the BL sample 312 have been obtained and can be decoded jointly to be rendered as an enhanced portion of the media content. It should be noted that in the embodiment illustrated in FIG. 5 both the EL sample 314 and the BL sample 312 correspond to the time t1. In other words, it is assumed that the sample offset is zero (see "sample_offset" parameter in the extractor of FIG. 6).

As has become apparent from the description of FIG. 7, the SVC client 104 does not have to generate the extractors at the time of media stream reception (which would require access to the decryption key corresponding to the key used to encrypt the EL layer). As a result, the SVC client 104 can record the SVC encoded and content protested media content in a file format that is compatible with both the ISMACryp and SVC specifications without prior decryption operations. Content protected SVC media files can thus be stored by the SVC client 104 without any changes of the existing ISMACryp specifications and without usage of any decryption key. The approach exemplarily illustrated in FIG. 7 is applicable to all kinds of scalability supported by the SVC standard, including spatial scalability, temporal scalability and SNR scalability.

Figure 8:
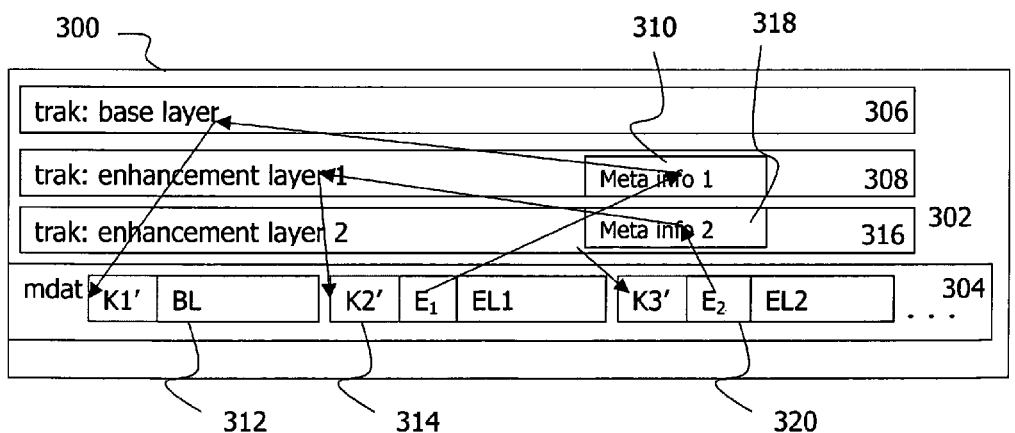
FIG. 8 is a schematic diagram illustrating a media file in a three-layer media content embodiment and its processing by a media client.

The SVC embodiment discussed above can be extended to scenarios with more than one enhancement layer. For example, a third (or fourth, fifth, and so on) media stream could be added to the scenario of FIG. 2 for transporting the encrypted sub-frames of a second (or third, fourth, and so on) enhancement layer together with the respective extractors. FIG. 8 schematically illustrates a further embodiment of a media file 300 configured to store media content that has been encoded to be received by the SVC client 104 in the form of a base layer and two enhancement layers. For this reason, a second EL track 316 will need to be added to the track container 302. The second EL track 316 is associated with a dedicated meta information portion 318 pointing to the EL track 308. The additional EL samples 320 received via the further EL media stream will be stored in the media data container 304 together with the BL samples 312 and the EL samples 314 pertaining to the EL stream 202 (see FIG. 2).

The first EL track 308 is read as discussed above in context with the scenario illustrated in FIG. 7. The second EL track 316 will be processed in a similar manner. That is, upon accessing the second EL track 316, the SVC client 104 finds a reference to the EL sample 320 and will read and decrypt it. To this end, a decryption key different from the decryption keys used to decrypt the BL sample 312 and the EL sample 314 will be required. Different from the scenario illustrated in FIG. 7, the extractor $E_2$ included in the EL sample 320 will not point to the BL track 306, but to the first EL track 308, so that the EL sample 314 can be read and decrypted, and the extractor $E_1$ of the EL sample 314 again allows to identify the BL track 306, so that the BL sample 312 can be read and decrypted. At the end of this "de-referencing" process, the SVC client 104 obtains (in this order) the sub-frame of the second EL, the temporally associated sub-frame of the first EL as well as the temporally associated BL sub-frame. These three sub-frames may then be decoded and rendered jointly at a quality or resolution that is enhanced even further compared to the scenario shown in FIG. 5.

Figure 9:
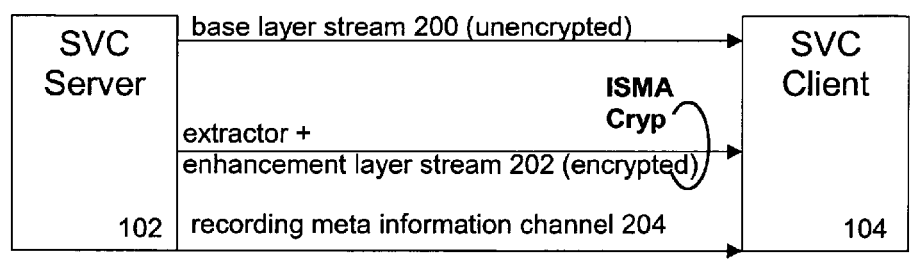
FIG. 9 is a schematic diagram illustrating a transmission of partially unencrypted media content via dedicated media streams from a media server to a media client according to a further embodiment.

An interesting use-case of scalable media content distribution systems such as the system 100 illustrated in FIG. 1 is a scenario in which one or more layers are streamed in an unprotected form and one or more further layers are streamed in a protected form to the media client 104. Such a scenario provides free access to the one or more unprotected layers, while consumption of the one or more further layers can be controlled as needed. For an implementation of such a scenario, the media server 102 of FIG. 1 is configured such that the output of the first layer encoder 108 may selectively bypass the encryption module 114 to be directly fed to the stream generator 116. This configuration permits in an exemplary SVC implementation that the BL stream 200 is distributed in an unprotected form, while the (at least one) EL stream 202 (including the extractors) is content protected as schematically illustrated in FIG. 9. The scenario of FIG. 9 has been derived from the scenario of FIG. 2, with the exception that the BL media stream 200 is distributed in an unencrypted fashion.

Since ISMACryp supports selective encryption, it can be also used for transmitting unprotected media content. However, according to the ISMACryp specifications it is still necessary in an multi-layer scenario to transmit for each unprotected sub-frame an ISMACryp specific header containing an indication that unprotected media content follows. In the scenario illustrated in FIG. 9, the ISMACryp header would thus have to be appended to each (unencrypted) BL sub-frame transmitted via the BL stream 200. As a result of the appended ISMACryp header, legacy media clients 104 not supporting ISMACryp might not be able to decode and render the BL sub-frames although the BL sub-frames are not encrypted. This problem is aggravated by the fact that support for ISMACryp is not defined as a mandatory feature in many content protection standards such as the Open Mobile Alliance (OMA) BCAST specification for mobile broadcast services.

To permit legacy SVC clients 104 without ISMACryp capabilities to decode the BL sub-frames, the BL sub-frames may in principle be streamed in an unencrypted manner and without ISMACryp headers, while the EL sub-frames are distributed as an ISMACryp protected media stream. However, in such a case storage of the EL media content for later consumption or distribution would not be possible as the BL sub-frames lack the ISMACryp headers.

In order to store unencrypted BL sub-frames and ISMACryp protected EL sub-frames in an ISMACryp compliant way, the ISMACryp headers may be added by the SVC client 104 to the BL sub-frames upon receipt. In the added ISMACryp headers, the selective encryption information as specified in the ISMACryp specifications is used to indicate that the media content accessible via the BL track is not protected.

Figure 10:
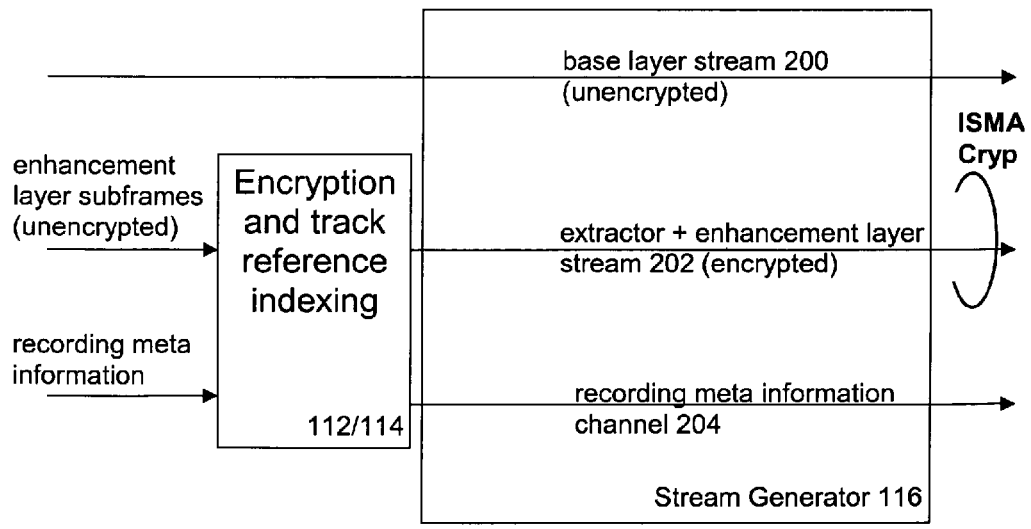
FIG. 10 illustrates a first embodiment for generating the streams shown in FIG. 9.
Figure 11:
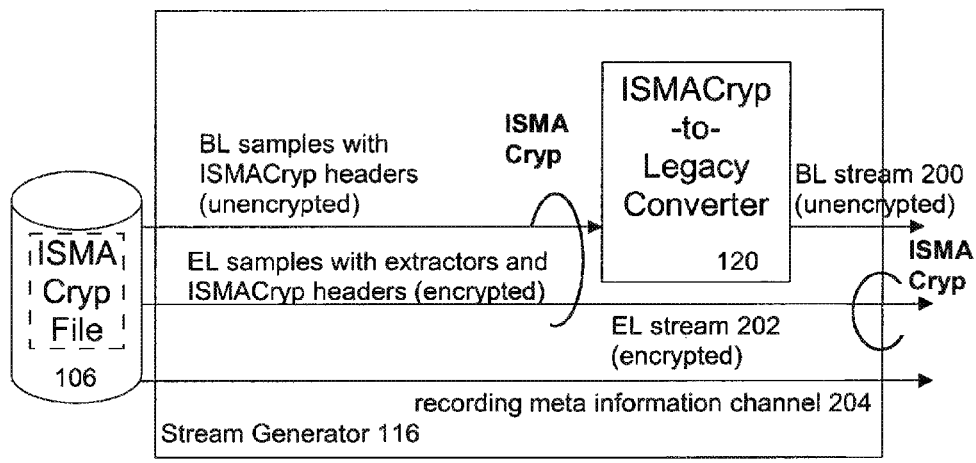
FIG. 11 illustrates a second embodiment for generating the streams shown in FIG. 9.

For implementing the streaming scenario illustrated in FIG. 9, the SVC server 102 may be configured as illustrated in FIGS. 10 and 11. In the configuration shown in FIG. 10, the stream generator 116 (see FIG. 1) receives the unencrypted BL sub-frames from the BL encoder 108 and generates the BL stream 200 without giving attention to any ISMACryp specific details. The track reference indexing and encryption modules 112, 114, on the other hand, process the recoding meta information (i.e. track layout information) as received from the track layout generator 122 and the EL sub-frames (and the corresponding track reference indices) as received from the EL encoder 110. Specifically, the modules 112, 114 generate the track reference indices corresponding to the EL sub-frames and associate (e.g. add, append, concatenate or include) the indices with the EL sub-frames, and perform the ISMACryp specific encryption steps in a conventional manner to generate the encrypted EL stream 202. The recording meta information is transmitted in parallel to the BL and EL streams 200, 202 via the recording meta information channel 204.

FIG. 11 shows an alternative configuration of the media server 102 for implementing the scenario illustrated in FIG. 9. It is assumed here that the SVC server 102 streams content from an SVC encoded and ISMACryp protected media file 300. The media file 300 could have a configuration as shown in FIG. 5 with the exception that the BL samples 312 (although including the ISMACryp headers) are not encrypted. The media file 300 may, for example, be read by the stream generator 116 of FIG. 1 directly from an ISMACryp file stored in the media content database 106.

Based on the content of the media file 300, the stream generator 116 generates the (encrypted) EL media stream 202 in a conventional way. The stream generator 116 further derives the track layout information from the media file 300 for being sent via the recording meta information channel 204. The processing of the BL data by the stream generator 116 differs, however, from the conventional processing. Specifically, as shown in FIG. 11, the stream generator 116 comprises an ISMACryp-to-legacy converter 120. The converter 120 is configured to convert the samples read from the media file 300 into a streaming format that is suitable for reception by legacy devices not supporting the ISMACryp streaming format although supporting reception of SVC BL sub-bit-streams. One example of a format that may be supported by such legacy devices is the RTP payload format for H.264/AVC (RFC 3984). Typically, the ISMACryp-to-legacy conversion process includes removing the ISMACryp header from the samples read from the media file 300. Thus, the stream generator 116 may generate the BL stream 200 comprising unencrypted BL sub-frames in the legacy format (i.e., without the ISMACryp headers).

A legacy SVC client 104 without ISMACryp support would decode or store only the media content received via the unencrypted BL stream 200. On the other hand, an SVC client 104 with ISMACryp support needs to be aware that the BL stream 200 has to be treated separately prior to storing as it does not comply with the ISMACryp specifications, while for immediate decoding and rendering no modifications are required.

Figure 12:
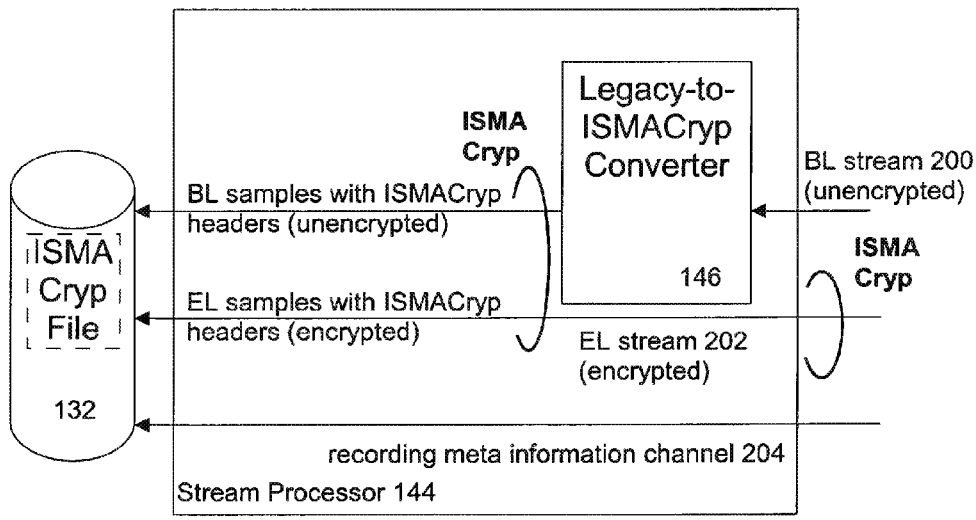
FIG. 12 schematically illustrates the processing of the streams generated as illustrated in FIG. 10 or 11 upon receipt by a media client.

An SVC client 104 with ISMACryp support may be modified as illustrated in FIG. 12 to be capable of storing the media streams 200, 202 as illustrated in FIG. 9 in an ISMACryp compliant file format. Specifically, a stream processor 144 as shown in FIG. 12 may be coupled between the input interface 130 and the data storage 132 of the SVC client 104 (see FIG. 1).

The stream processor 144 comprises a legacy-to-ISMACryp converter 146 capable of converting the BL stream 200 (with the unencrypted BL sub-frames and formatted according to a streaming format that is suitable for reception by legacy devices not supporting the ISMACryp streaming format although supporting reception of SVC BL sub-bit-streams, e.g. RFC 3984, and typically without ISMACryp headers) into an ISMACryp compliant format for being stored in the media file 300. To this end, the converter 146 appends an ISMACryp header to each unencrypted BL sub-frame. The converter 146 may perform further operations to convert the BL stream 200 into a format that is compliant with the ISMACryp streaming format. In accordance with the ISMACryp feature of selective encryption, the ISMACryp headers output by the legacy-to-ISMACryp converter 146 will indicate that their associated BL sub-frames are not encrypted. The EL media stream 202 is not specifically processed by the stream generator 144, and also the track layout information received via the recording meta information channel 204 does not get modified.

As has become apparent from the above description of FIGS. 9 to 12, the technique discussed herein can also be advantageously applied to record SVC encoded media content that is distributed partly as an ISMACryp protected media stream and partly in an unprotected manner. As a result, legacy SVC clients 104 without ISMACryp support may still store and decode the unencrypted media stream, while SVC clients 104 with ISMACryp support can store unprotected media streams not compliant with the ISMACryp standard at marginal additional implementation efforts.

Although FIGS. 9 to 12 refer to embodiments in which the BL stream 200 is unencrypted, it will be apparent that the BL stream may optionally be encrypted (e.g., in accordance with a cryptographic protocol different from ISMACryp in case legacy devices are equipped with a legacy content protection functionality). An encrypted BL stream corresponding to BL stream 200 may already be received in an encrypted form or may be retrieved in an encrypted format. Alternatively, an unencrypted base layer stream may be encrypted by an additional encryption unit that may be part of the stream generator 116. According to FIG. 10 and FIG. 11, the encryption unit may be part of the converter 120 and a corresponding decryption unit part of the converter 146, respectively.

In the foregoing, the principles, preferred embodiments and various modes of implementing the techniques disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of handling media content that is to be accessible via multiple media tracks of a media file, comprising:
providing a set of one or more first layer data items that are to be accessible via a first media track, each first layer data item being decodable to be rendered as a portion of the media content;
providing a set of one or more second layer data items that are to be accessible via at least one second media track, each second layer data item being decodable to be rendered in combination with at least one decoded first layer data item as an enhanced portion of the media content;
associating with each second layer data item a track reference index that identifies the first media track via which the first layer data items are accessible; and
encrypting at least the second layer data items and the associated track reference indices.

2. The method of claim 1, further comprising generating track layout information indicative of an arrangement of at least the first media track in the media file.

3. The method of claim 2, wherein the track layout information includes instructions controlling the arrangement of at least the first media track in the media file, and wherein the method further comprises generating the track reference indices in accordance with the track layout information.

4. The method of claim 1, further comprising generating a first media stream comprising the first layer data items and a second media stream comprising the encrypted second layer data items together with the encrypted track reference indices.

5. The method of claim 4, further comprising generating track layout information indicative of an arrangement of at least the first media track in the media file and transmitting the first media stream, the second media stream and the track layout information.

6. The method of claim 5, wherein the track layout information is transmitted separately from the first media stream and the second media stream.

7. The method of claim 4, wherein generating the first media stream comprises converting the first layer data items into a first layer format different from a second layer format of the second layer data items, or wherein generating the second media stream comprises converting the second layer data items into the second layer format different from the first layer format of the first layer data items.

8. The method of claim 7, wherein the second layer format is an encryption protocol format and the first layer format is a legacy format not compatible with the encryption protocol format.

9. The method of claim 1, further comprising encrypting the first layer data items.

10. The method of claim 9, further comprising generating a first media stream comprising the first layer data items and a second media stream comprising the encrypted second layer data items together with the encrypted track reference indices, wherein the first media stream comprises the encrypted first layer data items.

11. The method of claim 9, wherein the first layer data items are encrypted with a first encryption key and the second layer data items and the track reference indices are encrypted with at least one second encryption key different from the first encryption key.

12. The method of claim 1, further comprising transmitting the encrypted second layer data items together with the encrypted track reference indices in a media stream from one device to another device.

13. A method of handling media content that is to be accessible via multiple media tracks of a media file, comprising:
receiving a set of one or more first layer data items, each first layer data item being decodable to be rendered as a portion of the media content;
storing the first layer data items to be accessible via a first media track of the media file;
receiving a set of one or more encrypted second layer data items, each second layer data item being decodable to be rendered in combination with at least one decoded first layer data item as an enhanced portion of the media content, wherein the encrypted second layer data items are received together with associated encrypted track reference indices that identify the first media track with the first layer data items; and
storing the encrypted second layer data items together with the encrypted track reference indices to be accessible via at least one second media track.

14. The method of claim 13, further comprising providing track layout information, and wherein an arrangement of at least the first media track in the media file is controlled by the track layout information.

15. The method of claim 13, wherein the data items are stored outside the media tracks and wherein the media tracks contain references to the data items indicative of a sequence in which the data items are to be rendered.

16. The method of claim 13, further comprising decrypting the encrypted second layer data items and the encrypted track reference indices.

17. The method of claim 16, further comprising receiving at least one decryption key for decryption of the encrypted second layer data items and the encrypted track reference indices, wherein the at least one decryption key is received after the encrypted second layer data items together with the encrypted track reference indices have been stored.

18. The method of claim 13, wherein the received first layer data items are encrypted.

19. The method of claim 18, further comprising decrypting the encrypted first layer data items with a first decryption key and decrypting the encrypted second layer data items and the encrypted track reference indices with at least one second decryption key different from the first decryption key.

20. The method of claim 13, further comprising reading at least one of the media tracks and rendering the media content accessible via the at least one media track that is being read.

21. The method of claim 13, further comprising receiving the first layer data items via a first media stream in a first layer format, receiving the encrypted second layer data items and the encrypted track reference indices via a second media stream in a second layer format, and converting the first layer data items into a format compatible with the second layer format.

22. The method of claim 13, further comprising generating at least one media stream comprising at least one of the first layer data items, the encrypted second layer data items and the encrypted track reference indices, and transmitting the at least one media stream.

23. A computer program product stored on a non-transitory computer readable recording medium and comprising program code portions that, when executed by a device, cause the device to handle media content that is to be accessible via multiple media tracks of a media file, the program code portions causing the device to:
provide a set of one or more first layer data items that are to be accessible via a first media track, each first layer data item being decodable to be rendered as a portion of the media content;
provide a set of one or more second layer data items that are to be accessible via at least one second media track, each second layer data item being decodable to be rendered in combination with at least one decoded first layer data item as an enhanced portion of the media content;
associate with each second layer data item a track reference index that identifies the first media track via which the first layer data items are accessible; and
encrypt at least the second layer data items and the associated track reference indices.

24. A computer program product stored on a non-transitory computer readable recording medium and comprising program code portions that, when executed by a device, cause the device to handle media content that is to be accessible via multiple media tracks of a media file, the program code portions causing the device to:
store first layer data items in a received set of one or more first layer data items to be accessible via a first media track of the media file, wherein each first layer data item is decodable to be rendered as a portion of the media content; and
store encrypted second layer data items in a received set of one or more encrypted second layer data items together with received encrypted track reference indices to be accessible via at least one second media track, wherein each second layer data item is decodable to be rendered in combination with at least one decoded first layer data item as an enhanced portion of the media content, and wherein associated encrypted track reference indices identify the first media track with the first layer data items.

25. A device for handling media content that is to be accessible via multiple media tracks of a media file, comprising:
a first circuit configured to provide a set of one or more first layer data items that are to be accessible via a first media track, each first layer data item being decodable to be rendered as a portion of the media content;
a second circuit configured to provide a set of one or more second layer data items that are to be accessible via at least one second media track, each second layer data item being decodable to be rendered in combination with at least one decoded first layer data item as an enhanced portion of the media content;
a track reference indexing circuit configured to associate with each second layer data item a track reference index that identifies the first media track via which the first layer data items are accessible; and
an encryption circuit configured to encrypt at least the second layer data items and the associated track reference indices.

26. The device of claim 25, further comprising an output interface circuit configured to transmit the encrypted second layer data items together with the encrypted track reference indices in a media stream from said device to another device.

27. A device for handling media content that is to be accessible via multiple media tracks of a media file, comprising:
an input interface circuit configured to receive a set of one or more first layer data items and a set of one or more encrypted second layer data items together with associated encrypted track reference indices, wherein each first layer data item is decodable to be rendered as a portion of the media content and each second layer data item is decodable to be rendered in combination with at least one decoded first layer data item as an enhanced portion of the media content; and
a data storage circuit configured to store the first layer data items to be accessible via a first media track of the media file and to store the encrypted second layer data items together with the encrypted track reference indices to be accessible via at least one second media track of the media file.

28. The device of claim 27, further comprising at least one of
a decryption circuit configured to decrypt at least the encrypted second layer data items and the encrypted track reference indices; and
a rendering circuit configured to read at least one of the media tracks and to render the media content accessible via the at least one media track that is being read.

29. The device of claim 27, further comprising a streaming circuit configured to generate at least one media stream comprising at least one of the first layer data items, the encrypted second layer data items and the encrypted track reference indices.

* * * * *